US010283000B2

(12) United States Patent
Marr et al.

(10) Patent No.: US 10,283,000 B2
(45) Date of Patent: May 7, 2019

(54) UNMANNED AERIAL VEHICLE DEPLOYMENT SYSTEM

(71) Applicant: Vigilair Limited, Penrose (NZ)

(72) Inventors: Michael John Marr, Penrose (NZ); Andrew Stanley Grant, Penrose (NZ); Benjamin Yong Liang Kuek, Penrose (NZ); Yexi Zhu, Penrose (NZ)

( * ) Notice: Subject to any disclaimer, the term of this patent is extended or adjusted under 35 U.S.C. 154(b) by 273 days.

(21) Appl. No.: 15/298,696

(22) Filed: Oct. 20, 2016

(65) Prior Publication Data

US 2017/0115667 A1 Apr. 27, 2017

(51) Int. Cl.
| | |
|---|---|
| *G08G 5/00* | (2006.01) |
| *B64C 39/02* | (2006.01) |
| *G08B 13/196* | (2006.01) |
| *G08B 15/00* | (2006.01) |

(52) U.S. Cl.
CPC ......... *G08G 5/0069* (2013.01); *B64C 39/024* (2013.01); *G08B 13/1965* (2013.01); *G08B 13/19695* (2013.01); *G08B 15/00* (2013.01); *G08G 5/0034* (2013.01); *G08G 5/0091* (2013.01); *B64C 2201/12* (2013.01); *B64C 2201/14* (2013.01); *B64C 2201/22* (2013.01); *G08B 13/19608* (2013.01)

(58) Field of Classification Search
CPC .. G08G 5/0069; G08G 5/0034; G08G 5/0091; G08G 13/1965; G08G 13/19695; G08G 13/19608; G08G 15/00; B64C 39/024; B64C 2201/12; B64C 2201/14; B64C 2201/22

USPC .......................................................... 701/14
See application file for complete search history.

(56) References Cited

U.S. PATENT DOCUMENTS

| | | | | |
|---|---|---|---|---|
| 9,162,753 | B1 * | 10/2015 | Panto | B64C 19/00 |
| 9,671,790 | B2 * | 6/2017 | Srivastava | B64D 1/02 |
| 2005/0131607 | A1 * | 6/2005 | Breed | B60N 2/002 |
| | | | | 701/45 |
| 2006/0058928 | A1 * | 3/2006 | Beard | G01C 23/005 |
| | | | | 701/11 |
| 2008/0144884 | A1 * | 6/2008 | Habibi | G01C 11/02 |
| | | | | 382/103 |
| 2009/0138146 | A1 * | 5/2009 | Cochet | G05D 1/0202 |
| | | | | 701/11 |
| 2009/0303042 | A1 * | 12/2009 | Song | G08B 13/19647 |
| | | | | 340/566 |
| 2010/0100269 | A1 * | 4/2010 | Ekhaguere | G05D 1/101 |
| | | | | 701/26 |
| 2011/0017863 | A1 * | 1/2011 | Goossen | F41G 7/303 |
| | | | | 244/3.14 |
| 2011/0046817 | A1 * | 2/2011 | Hamke | G05D 1/101 |
| | | | | 701/3 |

(Continued)

*Primary Examiner* — Anne M Antonucci
*Assistant Examiner* — James S Stroud
(74) *Attorney, Agent, or Firm* — Wright Lindsey Jennings; K. Brandon Middleton

(57) ABSTRACT

A system for enabling an unmanned aerial vehicle (UAV) to respond to an alert on a premises, where the UAV may either confront the alert situation or monitor the alert situation from a distance. The UAV may respond to the alert situation after a controller receives alert event data from an alert generator. The controller may further match the data received to a number of event types stored in a database. This information allows a flight plan to be determined which will allow the UAV to navigate to a location associated with the alert situation.

13 Claims, 4 Drawing Sheets

(56) References Cited

U.S. PATENT DOCUMENTS

| | | | | |
|---|---|---|---|---|
| 2011/0144828 A1* | 6/2011 | Chengalva | .............. | F41H 7/005 |
| | | | | 701/2 |
| 2012/0261144 A1* | 10/2012 | Vian | ............... | G06Q 10/06315 |
| | | | | 169/43 |
| 2012/0286951 A1* | 11/2012 | Hess | .................... | G08B 25/008 |
| | | | | 340/539.1 |
| 2014/0067167 A1* | 3/2014 | Levien | ................. | G05D 1/0011 |
| | | | | 701/3 |
| 2014/0197982 A1* | 7/2014 | Wang | .................. | G08G 5/0008 |
| | | | | 342/37 |
| 2015/0205298 A1* | 7/2015 | Stoschek | ................ | G05D 1/021 |
| | | | | 701/23 |
| 2015/0323932 A1* | 11/2015 | Paduano | ................ | G05D 1/042 |
| | | | | 701/3 |
| 2016/0042637 A1* | 2/2016 | Cahill | .................... | G08B 25/10 |
| | | | | 701/3 |
| 2016/0086497 A1* | 3/2016 | Williams | ............. | G06K 9/0063 |
| | | | | 701/16 |
| 2016/0093225 A1* | 3/2016 | Williams | .................. | G01S 5/16 |
| | | | | 701/17 |
| 2016/0107749 A1* | 4/2016 | Mucci | .................. | B64C 39/024 |
| | | | | 701/3 |
| 2016/0343258 A1* | 11/2016 | Navarro | ................ | G01C 21/20 |
| 2016/0376031 A1* | 12/2016 | Michalski | ................ | B64F 1/36 |
| | | | | 701/15 |
| 2018/0090016 A1* | 3/2018 | Nishi | .................. | G08G 5/0039 |

* cited by examiner

UNMANNED AERIAL VEHICLE DEPLOYMENT SYSTEM

FIELD OF THE INVENTION

The invention generally relates to a system that interfaces between a security system and a UAV, and in particular to a system that determines a UAV flight path based on received security events.

BACKGROUND TO THE INVENTION

Unless otherwise indicated herein, the materials described in this section are not prior art to the claims in this application and are not admitted to be prior art by inclusion in this section.

Some security systems are known to output a notification when an event occurs that requires attention. The notification is typically responded to by dispatching security personnel to determine the cause of the event. However, there is a disadvantage to this approach on occasions where immediate attendance in person is neither economical nor practical.

It is an object of the present invention to go at least some way toward improving on the systems of the prior art or which improves or at least ameliorates some of the above-mentioned disadvantage or which at least provides the public with a useful choice. Other objects of the invention may become apparent from the following description which is given by way of example only.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

SUMMARY OF THE INVENTION

Accordingly, in one broad aspect, the invention consists in a system for enabling a UAV to respond to an alert on a premises comprising:
  an alert generator configured to output event type data and event location data in response to one or more alerts on the premises,
  a flight plan database configured to store a plurality of predetermined flight plans operable to direct a UAV to one or more locations on the premises,
  an event database configured to store a plurality of event types predetermined as suitable for a UAV response, and
  a controller configured to:
    receive the event type data and event location data,
    determine a match between the received event type and one or more event types in the event database,
    determine one or more UAV flight plans in the flight plan database has a destination proximate the event location, and
    output the selected flight plan to a UAV flight control system operable to allow a UAV to navigate to the alert location.
  In some embodiments, the controller is further configured to:
    receive meteorological data from one or more meteorological sensors arranged to measure data indicative of meteorological conditions at or near the premises, the meteorological data comprising:
      wind direction data,
      wind speed data, and/or
      rain fall data, and
    output the selected flight plan to a UAV flight control system operable to allow a UAV to navigate to the alert location when one or more meteorological data falls within a predetermined range and/or does not exceed a predetermined threshold.

In some embodiments, the system further comprises a database of UAVs available for launch, and the event database and flight plan database are further configured to store information pertaining to each UAV available for launch.

In some embodiments, the controller is further configured to receive information pertaining to one or more conditions determining readiness of a UAV for launch, and is configured to output the selected flight plan to the UAV matching the most predetermined conditions.

In some embodiments, the conditions comprise one or more of available UAV flight time, charge state of a power source and/or more tolerance to one or more meteorological conditions.

In some embodiments, the selected flight plan further comprises a three dimensional space defined by lateral and longitudinal distance ranges for one or more altitude ranges.

In some embodiments, the three dimensional space defines an area within which an operator is able to control the particular position of the UAV.

In some embodiments, the controller is further configured to:
  receive one or more event location data,
  determine a direction of movement of a potential intruder from the received one or more event location data
  determine one or more UAV flight plans in the flight plan database, according to one or more criteria, that has a destination proximate the event location, and
  output the selected flight plan to a UAV flight control system operable to allow a UAV to navigate to the alert location.

In some embodiments, the one or more criteria comprises a UAV attendance profile comprising:
  confrontation
  observation, or
  stealth.

In some embodiments, the confrontation UAV attendance profile comprises a flight plan directing the UAV to the location of the alert to oppose the determined direction of movement of the intruder.

In some embodiments, the observation UAV attendance profile comprises a flight plan directing the UAV to the location of the alert to follow the determined direction of movement of the intruder.

In some embodiments, the stealth UAV attendance profile comprises a flight plan directing the UAV to the location of the alert to oppose a determined wind direction.

In some embodiments, the flight plan output to the UAV further comprises instructions to deliver one or more on-board effects comprising emissions of sound waves or frequencies in the electro-magnetic spectrum, or the reception and onward transmission of such data, when at or proximate the alert location.

In another aspect the invention broadly consists in a controller configured for use between a security system and a UAV control system, the controller configured to:

receive event type data and event location data from an alert generator configured to output event type data and event location data in response to one or more alerts on a premises, determine a match between the received event type and one or more event types in an event database configured to store a plurality of event types predetermined as suitable for a UAV response, determine one or more UAV flight plans from a flight plan database has a destination proximate the event location, wherein the flight plan database is configured to store a plurality of predetermined flight plans operable to direct a UAV to one or more locations on the premises, and output the selected flight plan to a UAV flight control system operable to allow a UAV to navigate to the alert location.

In another aspect the invention broadly consists in a non-transitory computer readable medium having stored therein instructions that are executable to cause a computing device to perform functions comprising:

receiving an event type data and event location data from an alert generator configured to output event type data and event location data in response to one or more alerts on a premises generated by an alert generator configured to output event type data and event location data in response to one or more alerts on the premises, determining a match between the received event type and one or more event types in an event database configured to store a plurality of event types predetermined as suitable for a UAV response, determining one or more UAV flight plans from a flight plan database has a destination proximate the event location, wherein the flight plan database is configured to store a plurality of predetermined flight plans operable to direct a UAV to one or more locations on the premises, and outputting the selected flight plan to a UAV flight control system operable to allow a UAV to navigate to the alert location.

In another broad aspect the invention relates to any one or more of the above statements in combination with any one or more of any of the other statements. Other aspects of the invention may become apparent from the following description which is given by way of example only and with reference to the accompanying drawings.

As used herein the term "and/or" means "and" or "or", or both. The term "comprising" as used in this specification and claims means "consisting at least in part of". When interpreting statements in this specification and claims which include that term, the features, prefaced by that term in each statement all need to be present but other features can also be present. Related terms such as "comprise" and "comprised" are to be interpreted in the same manner.

It is intended that any reference to any range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference. This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
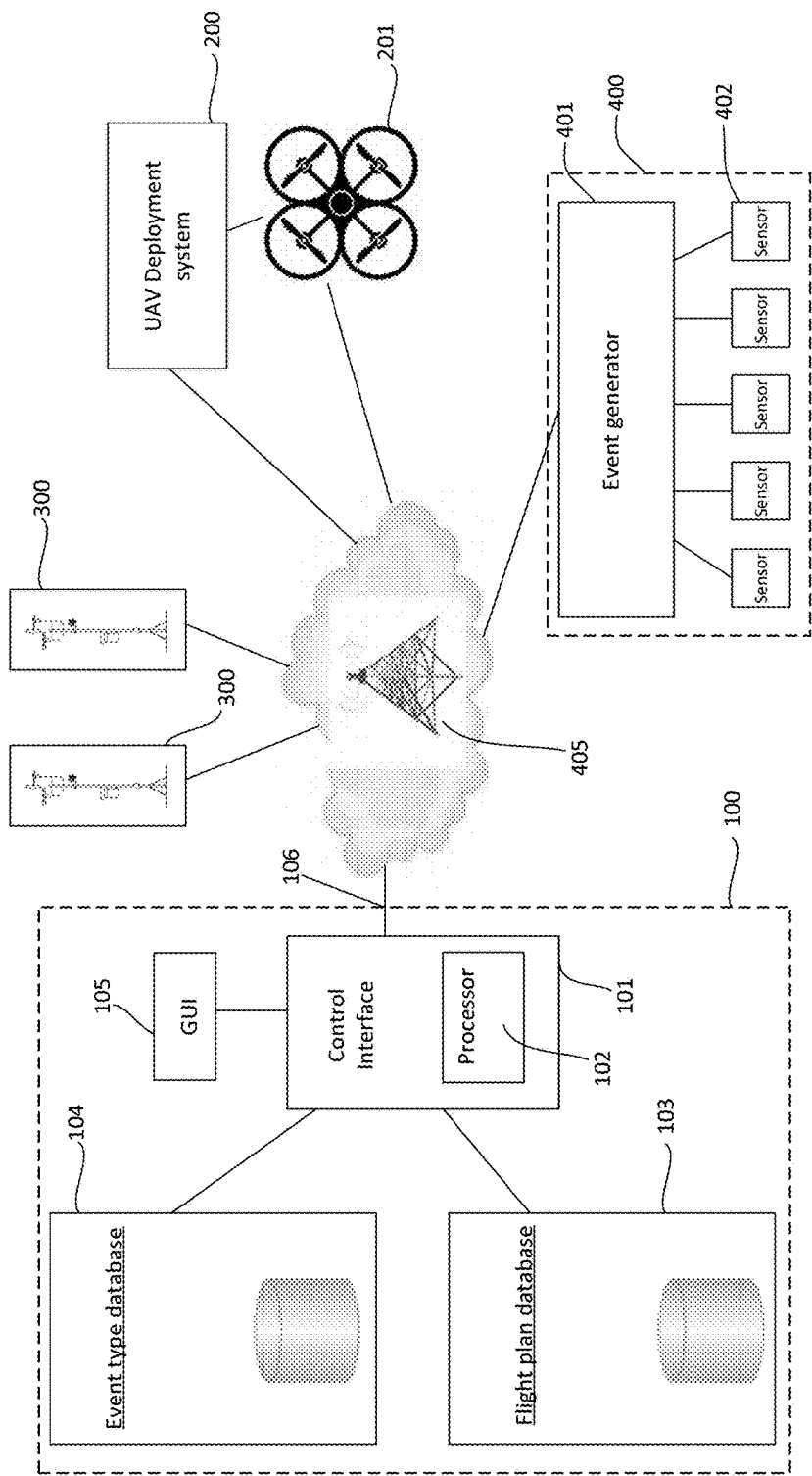
FIG. 1 shows a schematic diagram of an interface system for enabling a UAV to respond to an alert occurring on a premises.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems and methods can be arranged and combined in a wide variety of different configurations, all of which are contemplated herein.

Embodiments described herein may relate to and/or may be implemented as part of a security response system in which unmanned vehicles, and in particular, "unmanned aerial vehicles" (UAVs), are configured to respond to the occurrence of one or more events. In exemplary embodiments, an event is where one or more alerts are generated by a security system. In some embodiments, the security response system interfaces between a security system and a UAV flight control system or UAV dispatch system.

The term "unmanned aerial vehicle," or UAV, as used in this disclosure, refers to any autonomous or semi-autonomous vehicle that is capable of performing some functions without a physically-present human pilot. Examples of flight-related functions may include, but are not limited to, autonomous flight, sensing its environment or operating in the air without a need for input from an operator, among others. Further, embodiments herein are described in relation with aerial vehicles and flight paths. However, these embodiments are equally applicable to land or sea based vehicles capable of following a navigable path.

When an unmanned vehicle operates in a remote-control mode, a pilot or driver that is at a remote location can control the unmanned vehicle via commands that are sent to the unmanned vehicle via a communications link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while performing another task such as operating on-board sensors, emitters, or a mechanical system for picking up objects via remote control.

Various types of unmanned vehicles exist for various different environments. For example, unmanned vehicles exist for operation in the air, on the ground, on the water, underwater, and in space. Unmanned vehicles also exist for hybrid operations in which multi-environment use is possible. Examples of hybrid unmanned vehicles include an amphibious craft that is capable of operation on land as well as on water or a floatplane that is capable of landing on water as well as on land.

In an illustrative embodiment, a security response system may include one or more UAVs located on the premises, such as the grounds of, for example, a business, campus or residence. The security response system may be configured for communications with the UAV and a security system. The security response system receives event information from the security system and dispatches one or more UAVs to the scene of the security alert.

In further embodiments, event information provided by the security system is used to select a desired flight path of the UAV. For example, it may be desired that the UAV approaches to confront a security alert, or alternatively monitors the alert from a distance.

In an example embodiment, a UAV may initially use a navigation process that is based on a predetermined flight path to fly to a predetermined approximate target location that is associated with a security alert. For example, this may be desired when the UAV launch or loiter position is located distal from the premises where the security alert occurred. The UAV may navigate to the security alert, once reaching the premises, according to a predetermined flight path.

A UAV may be autonomous or semi-autonomous. Some functions could be controlled by a remote human operator, while other functions are carried out autonomously. Further, a UAV may be configured to allow a remote operator to take over functions that can otherwise be controlled autonomously by the UAV. Further, a given type of function may be controlled remotely at one level of abstraction and performed autonomously at another level of abstraction. For example, a remote operator could control high level navigation decisions for a UAV, such as by specifying that the UAV should travel from one location to another (for example, from a launch or loiter position to a premises), while the UAVs navigation system autonomously controls other navigation decisions, such as the specific route to take between the two locations, specific flight controls to achieve the route and avoid obstacles while navigating the route, and so on. Other examples are also possible. A remote operator could also control other aspects of the UAV such as movement of a camera.

A UAV can be of various forms. For example, a UAV may take the form of a rotorcraft such as a helicopter or multirotor, a fixed-wing aircraft, a lighter-than-air aircraft such as a blimp, a tail-sitter aircraft, and/or glider aircraft, among other possibilities. Further, the terms "drone", "unmanned aerial vehicle system" ("UAVS"), remotely piloted aircraft ("RPA") or "unmanned aerial system" ("UAS") may also be used to refer to a UAV.

Figure 5:
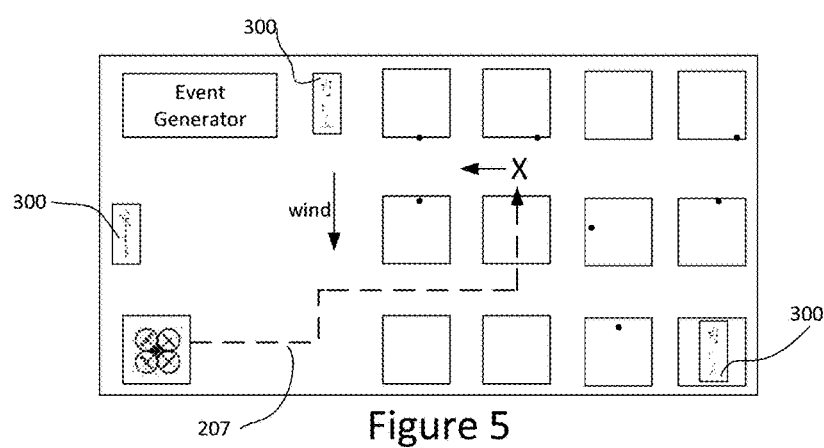

FIG. 5 is a simplified illustration of a UAV, according to an example embodiment. The UAV is an example of a rotorcraft 201 that is commonly referred to as a, multicopter, multirotor or specifically a quadcopter due to having four rotors 203. It should be understood that example embodiments may involve rotorcraft with more or less rotors than the depicted multirotor 201. Referring to multirotor 201 in greater detail, the four rotors 203 provide propulsion and manoeuvrability. More specifically, each rotor 203 includes blades that are attached to a motor 204. Configured as such the rotors may allow the multirotor 201 to take off and land vertically, to manoeuvre in any direction, and/or to hover. The multirotor 201 may propel and manoeuvre itself by adjustment of the rotation rate of the motors, collectively or differentially. In other embodiments, the multirotor may adjust the pitch of the rotor blades in order to control thrust and therefore how the multirotor manoeuvres. In further embodiments, a combination of rotational speed and rotor pitch adjustment is used to control the manoeuvrability of the multi rotor.

The multirotor 201 also includes a central enclosure 205 adapted to contain, for example, flight control electronics such as an inertial measurement unit (IMU) and/or an electronic motor speed controllers, batteries, other sensors such as positioning sensors, and/or a payload, among other possibilities. The central enclosure, or elsewhere on multicopter may further be adapted to contain communication electronics.

The multirotor 201 depicted also includes landing gear 206 to assist with controlled take-offs and landings. In other embodiments, multirotors and other types of UAVs without landing gear are also possible.

By increasing and decreasing the speed at which the rotors 203 spin, the multirotor 201 may control its pitch, roll, yaw, and/or altitude the direction and/or speed of its movement. In particular, the multicopter will roll in the direction of the motor with a decreased or decreasing speed.

A multirotor is typically powered by a power system that includes one or more batteries for providing power to flight control electronics and the motors. In one example, the one or more batteries may be rechargeable and each battery may be recharged via a wired connection between the battery and a power supply. Alternatively, the battery may be charged by an inductive power transfer system on the ground that transmits a time-varying magnetic field to an inductive power receiver coil located on the aircraft. In other embodiments the multirotor may be powered by other systems such as internal combustion engines, jet engines or fuel cells.

In an illustrative embodiment, an IMU may include both an accelerometer and a gyroscope, which may be used together to determine the orientation of the UAV 201. In particular, the accelerometer can measure the orientation of the vehicle with respect to earth, while the gyroscope measures the rate of rotation around an axis. For instance, an IMU may take the form of or include a miniaturized MicroElectroMechanical System (MEMS) or a NanoElectroMechanical System (NEMS). Other types of IMUs may also be utilised. For example, the Pixhawk flight controller incorporates an Invensense MPU6050 or similar integrated circuit providing both gyroscopic and accelerometer measurements at a high resolution.

An IMU may include other sensors, in addition to accelerometers and gyroscopes, which may help to better determine position and/or help to increase autonomy of the UAV 201. Examples of such sensors include magnetometers for detecting magnetic heading information or compass information and a pressure sensor or barometer for detecting fine altitude adjustments and/or airspeed information. Other sensors, such as sonic altimeters or radar altimeters, can be used to provide an indication of attitude, which may help to improve the accuracy of and/or prevent drift of an IMU.

The UAV 201 also includes a satellite navigation receiver configured to provide data that is typical of well-known satellite navigation systems, such as the positional coordinates of the UAV 201. Exemplary satellite systems include the Global Positioning System—GPS and Globalnaya Navigazionnaya Sputnikovaya Sistema, or Global Navigation Satellite System—GLONASS. Such positional data may be utilized by the UAV 201 for various functions. For example, when a system requests the UAV to report its location, the UAV may provide its positional coordinates derived from a satellite navigation system. As such, the UAV may use its satellite navigation receiver to navigate to a desired location.

In some embodiments, the UAV 201 also includes one or more sensor(s). For example, one or more still and/or video cameras may be utilised by a UAV 201 to capture image data from the surrounding environment. Such sensor(s) have numerous possible applications, such as obstacle avoidance, video feedback, and/or image recognition and processing, among other possibilities. The sensors may operate and sense across the entire electro-magnetic spectrum and the spectrum of sound waves. They may be active or passive or both. They may also work in concert to sense a number of different ranges across the spectrum.

In a further aspect, the UAV 201 may include one or more microphones. Such microphones may be configured to capture sound from the UAVs environment.

In a further aspect, the UAV 201 may include a number of effectors. These may be included as part of the UAV systems or as part of a payload. These effectors may be able to create effects by transmitting across the electromagnetic spectrum or by transmitting sound waves. Illustrative effects include public address, sirens, alarm tones, visual spectrum light, infrared, and laser.

In a further aspect, the UAV 201 includes one or more wireless communication interfaces that allow UAV 201 to communicate via one or more networks. Wireless interfaces may provide for communication under one or more wireless communication protocols, such as Bluetooth, WiFi, Mavlink and/or other wireless communication protocols.

Figure 6:
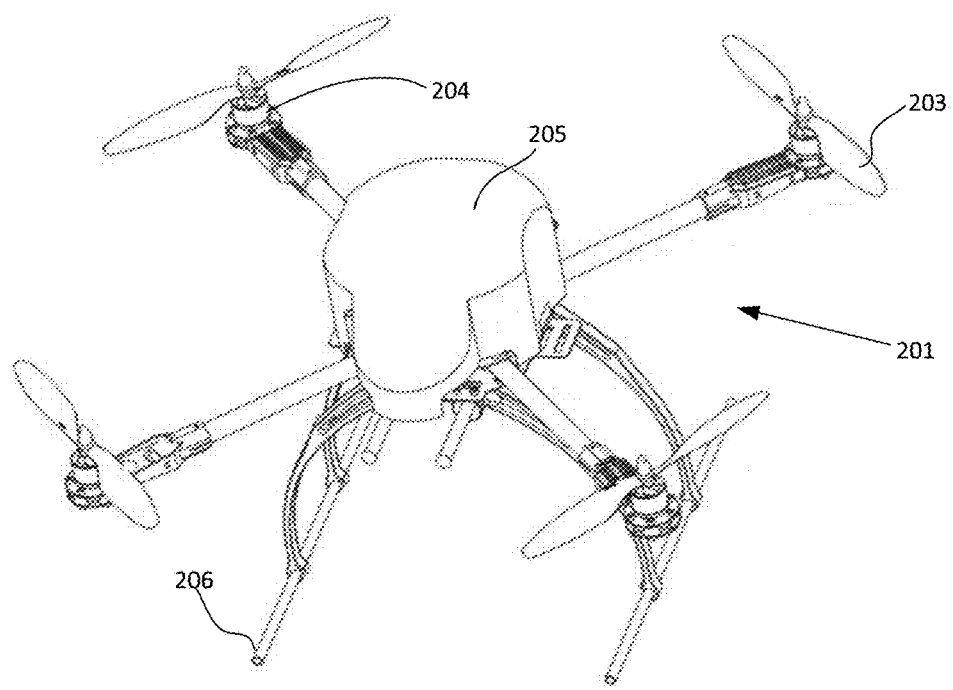
FIG. 6 is a simplified illustration of an example UAV.
Figure 7:
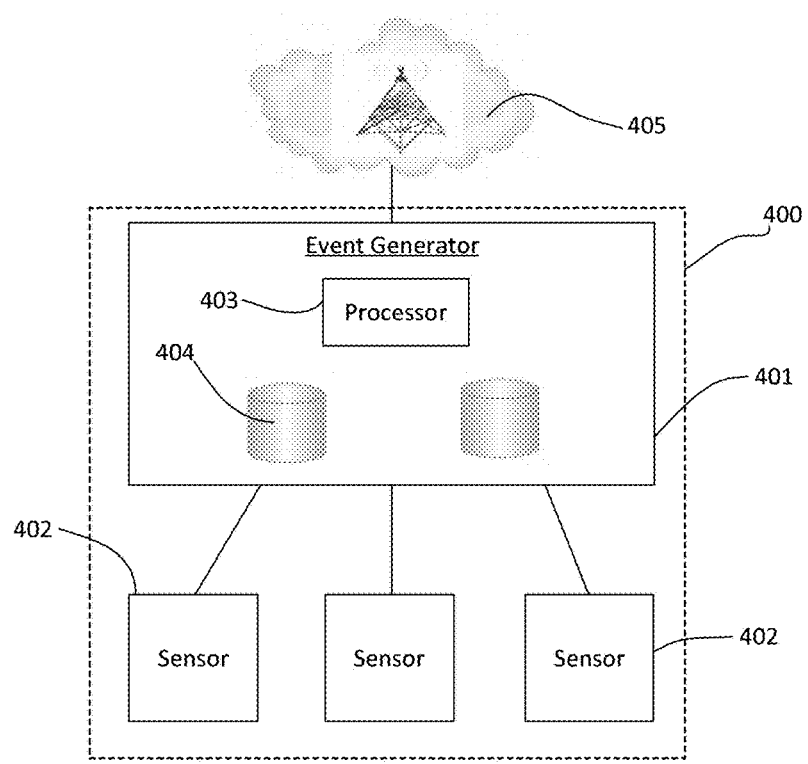
FIG. 7 shows a diagram of a security management system of a kind that may be installed to monitor the premises, and/or buildings on the premises of a business, campus or residence.

FIG. 6 shows a generic schematic diagram of a security management system 400 of a kind that may be installed to monitor the premises, and/or buildings on the premises of a business, campus or residence. Security management systems generally have a set of sensors that are matched to the data-types being monitored. When any thresholds for these data-points are exceeded, an 'event' occurs and the security management system provides a notification of this event.

The security system typically has one or more central control units 401 connected to one or more sensor units 402. Sensor units 402 are typically installed to monitor physical aspects of the premises indicative of the presence of, for example, an intruder. The sensor units 402 may be proximity detectors, switches or cameras. Many other sensors are possible. In some forms, the sensors may be configured to generate an output voltage or digital signal that is monitored by the central control unit 401. A change in the characteristics of the output voltage, or digital signal, may indicate a change in the physical aspects of the area proximate the sensor.

In one example, an infrared detection sensor may be implemented on or in a building to monitor the physical conditions of a pathway. A person in the pathway will cause the sensor to output a signal that differs from the signal output when no person is present in the pathway. The sensors 402 and/or control system 401 may include processing or control electronics to convert their output into a different form for ease of interfacing with other devices.

The central control unit 401 typically has a processor 403 connected to receive signals from the sensors 402 and make control decisions. For example, the processor 403 may be programmed with a set of instructions that operate to generate a signal indicating a change of circumstances has taken place in one or more the sensors 402. The processor may be further configured to select an event message to be output when a sensor status changes. In such circumstances, a list of event messages can be stored in one or more databases 404 connected to the processor. An event message can be retrieved when an event takes place.

An event message of a security or other monitoring or surveillance system is typically an indication that output characteristics of a sensor has changed and the location of that sensor. However, additional data is also possible to be output. Such data may include the type of sensor, a general indication of the alert indicated by the sensor, the type of change indicated by the sensor and/or the time the sensor output characteristics changed.

The processor is able to generate and output an event message containing one or more data items of interest. Event messages may be received and interpreted by, for example, a manned security operation. Event messages may also be used to automate a response such as initiating an alarm or siren to sound on the premises.

In some circumstances, the premises may be located remotely from a station where event messages are generated and output. The security management system 400 may have a connection to one or more remote facilities, such as a security business, via a wired or wireless connection such as telecommunication lines, the internet or satellite. Further, the security management system 400 may report to a cloud server through internet, via IP monitoring, WiFi, GSM, satellite or other data communications path.

The event may comprise a string of characters where each character, or a group of characters, defines particular information. For example, the particular information may include some or all of the following data:
  a code that uniquely identifies the event message format
  a subscriber or client identification
  an event qualifier, which may identify specific event information. For example, whether the message is a new event or a previous event
  an event code, which may identify the type of sensor that has been toggled
  a location code, and/or
  a sensor identification code. For example, identifying a particular sensor that has changed characteristics.

The event message is typically in the form of a serial code that is easily transmitted through communication networks. Further, the event message may have a form of encryption to prevent interception of the code by unwelcome parties.

A simple example of a security alarm system is where a processor receives information from sensors such as Passive Infrared (PIR) devices. Once one of the PIR register an amount of Infrared emission over the set threshold, an alarm event is created and notified. In terms of terms of a generic process, the notification is an indication that something has occurred in a general location where the PIR sensor is located. In terms of desired outcomes, it is evident that more information is desired to inform a decision-making process where a determination of what ultimate outcome or 'effect' is desirable to manage that particular event that has occurred.

Embodiments described herein operate to interface between an UAV, or UAV deployment system and a disparate security management system; and under particular conditions, output a signal operable to deploy a UAV to attend a security event.

In some embodiments of the invention, there is provided a control system that receives event messages and parses the data to identify the premises or site, address, and type of alarm event. The control system may further match the context of the alarm event and verify the suitability of a UAV response at that particular location. The control system may further check criteria that may preclude UAV flight including local metrological conditions, UAV on-board power state and systems readiness, and launch enclosure readiness. These parameters and an availability to launch on that event is presented to an operator so that they may make a final decision to launch a UAV.

A UAV attending appropriate events is often able to provide valuable information in addition to the information provided by the security system. The additional information can be provided and used in real-time or near real-time by security personnel to make more informed decisions on how to respond to a security event. Further, additional information provided by the UAV can be stored for future reference in circumstances where that information may have become valuable.

A human presence is often utilised to establish the causal factors of a notified security event and in some cases respond directly to any security threats that arise. However, a UAV may provide the following benefits or alternatives to human attendance:
- speed of attendance to the event location
- safety, as personnel are not directly attending the scene of the event
- visibility due to aerial visual perspectives
- autonomous response
- low cost response compared to dispatching personnel
- semi-autonomous operation with man-in-the-loop, and/or carriage of different effects payloads that can be activated remotely.

In some embodiments, there is a system interface that sits between a Security Management System (SMS) that can output event messages, according to a protocol, and a ground Control Unit (GCU) that is capable of receiving a UAV Flight Plan for a UAV Flight Control Unit, and displaying flight information from the UAV.

In some embodiments, there is communication directly between the UAV controller and the GCU via the system interface. Premises information, for example the business premises of a client of a security firm, including description and location is maintained within the system in a database. Various alarm types are received by the interface allowing the system interface to identify the client and select the correct information.

In some embodiment an audit trail is created to provide a record of the incoming events as well as subsequent actions. In some embodiments, the interface allows for a user control to accept a proposed action to launch a UAV and to respond to a security event by selecting a suitable predefined navigation path and following that route. It may be further advantageous that a further user control is provided to abort the launch after initiation, and/or to return to the GCU, if it is selected post-launch.

In some embodiments, the interface system communicates with local real-time weather data from a weather station within the system, to apply a go/no-go filter to flight proposals.

In some embodiments, a cloud server is provided to allow remote management of the system and access from a centralised flight management control room.

FIG. 1 shows a schematic diagram of an interface system for enabling a UAV to respond to an alert on a premises 400. In particular, rapid selection of a suitable navigation path that corresponds with a security event, and dispatch of an unmanned vehicle to the premises can be achieved. The premises 400 is monitored by one or more sensors 402 that form part of a security management system 400 as described above. The security management system 400 is connected to a control management system 100 via a communication network 405. In some embodiments, the control management system 100 may have further connection to one or more weather stations 300.

A preferred weather station 300 operates to gather meteorological information that may be relevant to UAV flight. For example, the weather station may gather information such as wind speed, wind direction, rain, hail and snow levels.

The control management system 100 comprises a control interface that interfaces with the communication channel 405 to receive information from the event generator 401, and the one or more weather stations 300. The control interface is further configured to interface with a UAV deployment system 200, or directly with a UAV 201. One or more UAVs may be housed, for example, in a launch enclosure that protects them from environmental conditions when not in use. The launch enclosure may further facilitate charging and the transfer of condition information, of the UAVs, when not in use.

In some embodiments, the UAV deployment system 200 is a system that interfaces between the UAV flight controller and the communication network via which instructions are received. The deployment system may further control launch enclosure operation. However, in some embodiments the UAV may communicate directly with the communication network 405 and to the control management system 100.

The control management system 100 has a processor 102. The processor 102 may be a general-purpose processor such as a microcontroller, or a special purpose processor such as a digital signal processor or application specific integrated circuits. The processor 102 is configured to execute computer-readable program instructions that are stored in data storage and are executable to provide desired interface and control functionality. The processor is further configured to interface with one or more databases 103, 104 containing information relating to event messages and information relating to desired UAV flight paths.

In particular, the processor 102 is configured to process event messages received from the event generator 401. The event messages are processed to determine two key data types which include event type data and event location data. An event type database 104 is configured to store event type data, for a particular premises, to which a UAV attendance would be appropriate. Further, a flight plan database 103 is configured to store flight plan data, for a particular premises, that would enable a UAV to attend the location, or approximate location of the event.

The event type data stored by the event database may include events such as Medical Alarms, Fire Alarms, Duress Alarms, Burglar Alarms, Water Leakage Alarms and Sensor Tamper Alarms.

The flight plans stored by the flight plan database 103 may be in a form that is directly interpreted by the flight controller of a UAV or at least by software overseeing the UAV flight. In one example embodiment, the UAV flight controller is configured to receive flight plan information in the Mavlink protocol such that Pixhawk or similar flight control system can utilise. The output messaging in Mavlink communication protocol is required to be compatible with both serial, TCP and UDP connections for communication to UAV; or to intermediate software, for example, Mavproxy software.

A flight plan for a particular premises will contain some or all of the following flight information:
- a destination waypoint that is associated with the received event message. The destination waypoint may be a location where the UAV is able to obtain the best view of the area proximate where a sensor 402 was activated.
- one or more intermediate waypoint locations. The intermediate waypoints may include intermediate waypoints that the UAV must pass through before reaching the destination waypoint, or alternatively, returning home from a destination waypoint. The intermediate waypoints may be useful for navigating obstacles such as buildings
- a home position which includes latitude, longitude and height to allow a UAV to have an accurate launch and landing position
- one or more speed variables for a UAV to accelerate to while heading to a waypoint, and/or
- the height for a UAV to climb to, after launch, while heading to waypoint The flight plan may further include information the UAV control system may use to direct one or more cameras or sensor. For example, location based camera tracking could be implemented to lock a camera perspective, in transit to, or at, a particular coordinate for each or a select waypoint or destination location.

In some embodiments, there may be ten values to be sent to the UAV:
1. Sequence No
2. Frame
3. Action at Waypoint
4. Latitude
5. Longitude
6. Altitude (Meters)
7. Yaw Angle
8. Radius at waypoint
9. Hold Time
10. Continue In some embodiments, the flight plan output to the UAV further comprises instructions to deliver one or more on-board effects comprising emissions of sound waves or frequencies in the electro-magnetic spectrum, or the reception and onward transmission of such data, when at or proximate the alert location.

In some embodiments, the destination location, or alert location, in the flight plan for the UAV comprises a three dimensional space within which the UAV is to be positioned depending on one or more intended potential uses. The three dimensional space is defined by parameters including nearby hazards and desired proximity to the target location. The three dimensional space is defined by any combination of latitude, longitude and altitude ranges. However, the space may further be complex in shape in that, for example, differing latitude and longitude ranges may be present for two or more altitude ranges thereby defining a multifaceted space.

The desired position of the UAV within the space is determined by factors including, for example, whether the UAV is to observe a target area, confront a target area or maintain a safe distance from hazards proximate the target location. For example, the position of the UAV within the space may be central and low altitude when the UAV is desired to confront an intruder determined to be in the target location. In another example, the position of the UAV within the space may be central and low altitude to allow audible communication with the intruder.

In some embodiments, the control management system 100 comprises an output configured to allow an operator to select one or more locations within the three dimensional space for the UAV to hold position. In some embodiments, the control management system is further configured to store information pertaining to the three dimensional space at a target location. In some embodiments, the flight plan data stored in the flight plan database comprises three dimensional space information operable to define a geofence, within which the target location resides, to thereby define an area for UAV operation when at or proximate a target location. In some embodiments, the event type database is configured to store three-dimensional space information defining a UAV operational area around the target location.

In some embodiments, the control management system 100 may be further configured to store separate flight path data and meteorological limits pertaining to more than one individual UAV. For example, some UAVs available to the system 100 may be operable in rain or high wind compared to other UAVs. In addition, some UAVs may be operable to follow some flight plans, but not others. For example, a flight plan with a static target destination would best suit a multirotor UAV, but not a plane or fixed wing UAV. In another example, a plane or fixed wing UAV may offer a longer observation time compared to a multirotor UAV. Therefore, in some embodiments it may be advantageous to have separate event information and flight plan information stored for each particular UAV available for launch. Where two or more UAVs are available for launch, the particular UAV selected may depend on factors such as which UAV has the longest operation time, highest battery charge state, or other such considerations.

Figure 2:
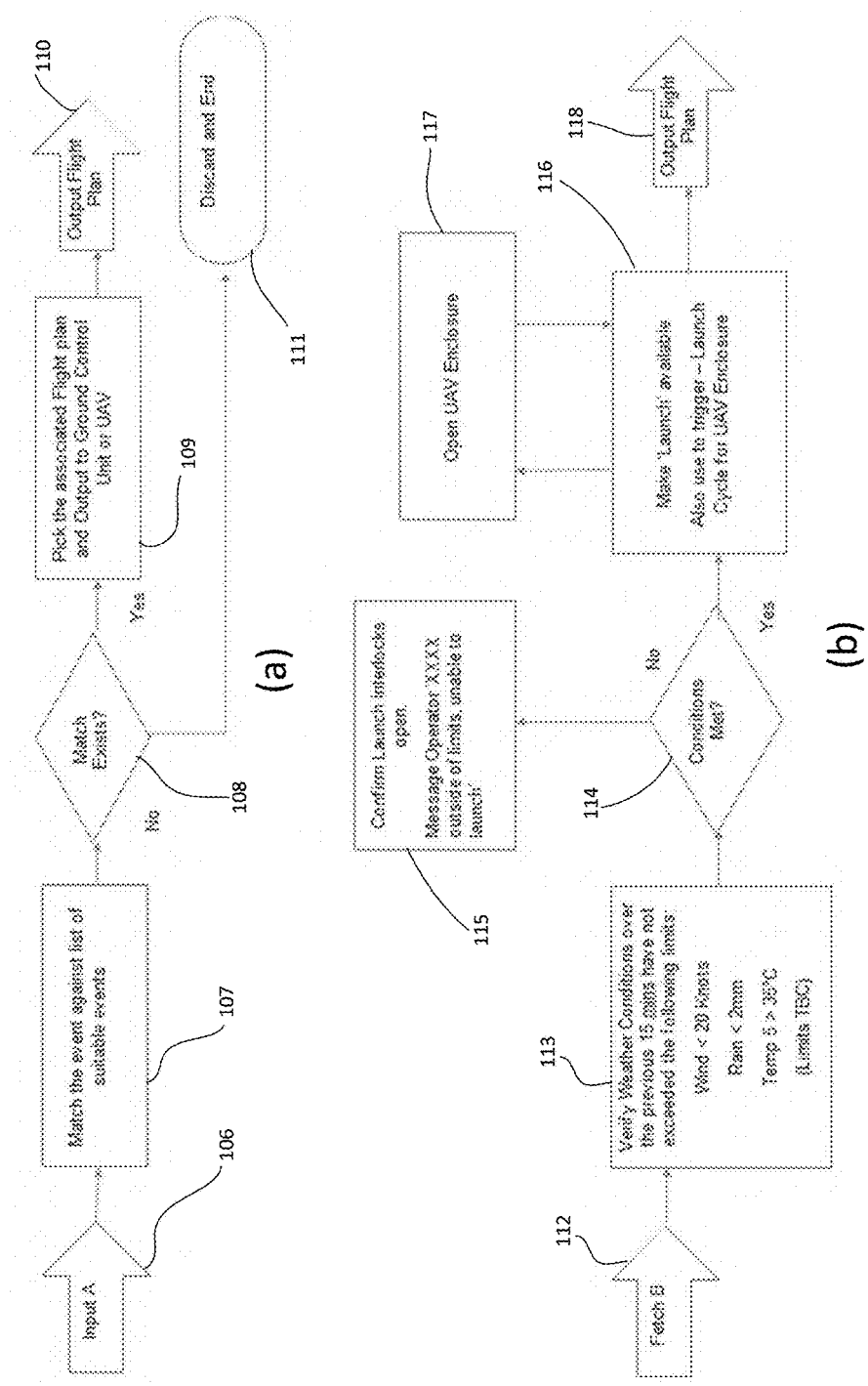
FIG. 2 shows an example of processes undertaken by a control management system.

FIG. 2 shows an example of processes undertaken by the control management system 100. FIG. 2(*a*) shows a primary process undertaken by the control management system 100. The input 106 to the control management system 100 receives an event message from the security management system 400 via a communication network.

At step 107, the received event message is parsed to determine event type data. If a valid event data type is determined, the data is compared to one or more predefined event data types stored in the event database 104 to determine a match. At step 108, a match is determined. If a match does not exist, the process discards the received event message and the process ends.

If a match between the parsed event type data from the received event message and the event type data stored in database 104 does exist, the process then further analyses the received event message to determine event location information. The event location information may be coordinates, such as GPS coordinates, or it may be in another form of spatial positional information that can be used for navigation and/or identification of the occurrence of the event message. Event location information determined from the received event message is compared to one or more stored flight plans in the flight plan database 103. A match is determined when flight criteria is met. Flight criteria may include the existence of a flight plan in the database that has either a destination location at, or at least proximate to, the received event location; or alternatively, has at least a flight path that passes at or near to the received event location.

At step 109, the control management system 100 selects a flight plan from the database when one or more of the above flight criteria are met. The flight plan may then be output to the UAV 201 or UAV deployment system 200 via the communication network.

FIG. 2(b) shows a secondary process undertaken by the control management system 100 in order to incorporate further decisions into the process shown in FIG. 2(a). At step 112 the control management system 100 queries the one or more weather stations 300 to retrieve data on present and/or historical meteorological conditions that may be relevant to UAV flight. Retrieved weather data is compared at step 113 to one or more predetermined weather threshold parameters. Example weather data includes wind, rain and temperature data. Example predetermined weather threshold parameter limits include an upper wind limit, an upper rainfall limit and an upper temperature limit. Other weather data may be considered. In some embodiments, the system 100 analyses whether any of the limits have been exceeded within a predetermined timeframe window of, for example, 15 minutes.

At step 114, weather data is parsed to verify whether inside or outside of the predetermined weather threshold parameter limits. A notification can be sent to an operator via the GUI 105 if one or more weather parameters are outside of the limits and UAV flight is not possible. The system can also be configured to prohibit flight when the conditions are determined to be unsuitable, for example, where one or more of the meteorological limits are exceeded.

A simplified graphic user interface (GUI) that allows the operator the most simplified interaction possible: launch for event, pause, abort, complete the task and land. Further, a data logging function may be provided to record data exchanges and operator inputs, allowing for analysis of system performance, fault diagnosis and operator inputs.

In some embodiments, the UAV deployment system may have a set of interlocks to provide positive control of the core UAV launch system 200 functions and sequencing. The interlocks may be mechanical, electro-mechanical or software based, or any other system that will provide a positive set of breaks in the software and electro-mechanical chains that comprise the invention. The purpose of these interlocks will be to provide system feedback loops to ensure that key system sequences are performed correctly, without hazard to components or persons. An illustrative embodiment of these interlocks is on the enclosure at step 115. Whereby, if the enclosure does not complete its opening sequence, an interlock will remain open and prevent the UAV from launching. Only when the enclosure has completed its opening sequence, will the interlock close, and allow the UAV to launch from an enclosure that it is in a state known to allow unhindered launch. The interlocks will invariably provide a set of checks and balances in parallel with any feedback or sequences in the core system software.

If launch conditions are met, at step 116 a message can be provided to an operator indicating UAV launch is possible. At step 118, the flight plan is output from the control management system 100 and sent to the UAV for use. The control management system 100 may output further intermediate data operable to control the operation of any UAV launch enclosure. For example, step 116 indicates a message sent to a UAV enclosure to open, or remove a weather protection shield to allow the UAV to take off. The control management system 100 may further wait for the enclosure to be opened 117 before the UAV is signalled to launch.

The UAV, in combination with the selected flight path and the particular security event type may be able to provide different functions such as to provide a deterrent, to allow a security event to be observed from a distance or vantage point and/or to allow close observation of a security event. Factors for determining the particular flight path selected for a given security event include:
  the payload of the UAV
  the UAV enclosure system which, for example, may provide automated launch, dispatch, recovery, and/or charging/refueling
  a launch/dispatch sequencer that loads the appropriate navigation path and sequences the vehicle to depart from a secure enclosure and commence the journey to the event location
  a communication system operable to monitor UAV telemetry, such as the position and the UAVs onboard systems
  information support systems that can provide automated decision-making support to the operation of the UAV, for example, an information feed from a weather station to verify whether conditions are suitable for the unmanned vehicle, and/or
  avoiding hazards on the premises.

In some embodiments, the control system 100 is configured to consider the amount of time a UAV may take to reach a premise from the location it would be launched from. If the flight time to reach the security event location is above a threshold time, the UAV will not be launched. The threshold time may be determined by considerations such as the total flight time of the UAV provided by the on-board power source at the particular state of charge, or whether personnel may reach the event location sooner or within a comparable time.

Figure 3:
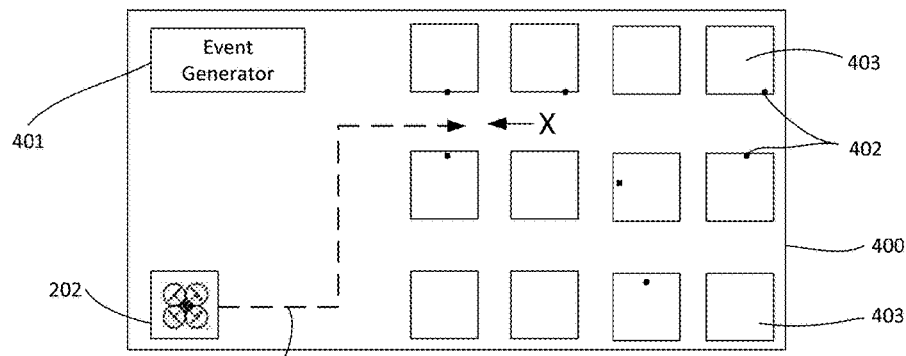
FIGS. 3 to 5 illustrate example UAV flight paths.
Figure 4:
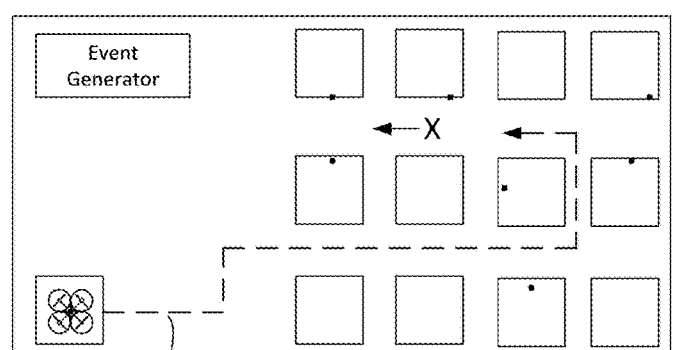

FIGS. 3 to 5 each show an example of a flight path selected to respond to a security event. Particular flight paths could be selected based on one or more received event messages that indicate the position of a situation appropriate for attendance by a UAV. Particular flight paths may be designed so as to confront a security event, observe a security event from a distance, or approach the security event using knowledge of environmental conditions that may obscure the presence of the UAV.

FIGS. 3 to 5 show an example of a premise that has a number of buildings 403. One or some of the buildings or locations on the premises have sensors 402 that operate to detect movement of objects within the grounds of the premises. The sensors are connected to a security control system 401 that operates to generate a security event when the sensors 402 detect changes in environmental states. The premise has a UAV launch site 202 that may contain one or more UAVs.

The control management system 100 according to above described embodiments is connected to receive event messages from the event generator 401 by the communication network 405. In some embodiments, the control management system 100 is located on the premises, and in other embodiments, the control management system 100 is located remotely and may connect to and monitor event messages from several premises simultaneously.

In some embodiments, the control management system 100 is configured to receive security event messages that indicate the presence of an intruder to a premises and the direction of movement of that intruder. Information about the direction of movement could be obtained, for example, from two event messages indicating a procession of proximity sensors have had detections. Direction information can also be derived from information regarding the location of the sensor, such as within a corridor where only one direction of movement is possible, or at least likely, relative to the sensor that had a detection. Further, direction information may be derived, for example, manually by an observer or by image processing techniques applied to camera footage. For example, optical flow techniques may be applied to multiple video frames to determine the direction of movement of pixels in those frames, thereby indicating the direction of movement of an object shown in the camera footage.

A UAV flight path to confront an intruder, for example, may be one that approaches the intruder at a relatively low altitude and from the direction to which the intruder is moving. FIG. 3 illustrates an example of a UAV flight path 203 that is designed to confront an intruder, indicated by X and moving in the direction of the arrow shown.

A UAV flight path to observe an intruder, for example, may be one that approaches the intruder from a distance and from behind the intruder's direction of movement. FIG. 4 illustrates an example of a UAV flight path 207 where the UAV is to navigate around obstacles on the premises and approach the intruder from the rear.

In some situations, it may be desirable that the UAV is not detected by an intruder on the premises. In such situations, the control management system 100 may use information received from one or more weather stations 300 to determine the wind direction at the premises. In some embodiments, the control management system 100 is configured to select a UAV flight plan based on the where the UAV will arrive at or proximate to the event location from a direction opposing the direction of the wind. For example, by determining the wind direction, control management system 100 is able to select a flight path with a route that arrives at a location in a direction opposite to the wind direction. By approaching the security event location from downwind, for example, the noise generated by the UAV apparent to the security event location is minimised. FIG. 5 illustrates an example of a UAV flight path 207 where the UAV is to navigate to the intruder X in a direction opposing that of the wind such that the UAV is substantially downwind of the intruder.

As noted above, the UAV 201 may include one or more sensors including cameras and a camera direction control module that includes software, firmware, and/or hardware that may be used to direct a camera to the location of a received event message. The camera footage may be recorded or streamed live back to a control station to provide or assist with security operations on the premises. The UAV 201 may also have a payload on-board to assist security personnel at the scene of the security event. Configured as such, a UAV 200 may provide security support in various ways. For instance, a UAV 201 may have stored information or on-board equipment that can be provided to a person or persons at the location of the security event, in order to assist the person or persons attending to the security alert. In another example, the UAV may include a video or audio capability to provide an alert message or alarm, which the UAV can transmit at the target location to, for example, alert, deter or dissuade an intruder.

As noted above, control system 100 may be implemented by software, firmware, hardware, or a combination. In one embodiment, the control system 100 is implemented by a dedicated server interfacing, via the internet, to one or more security systems, meteorological systems and UAV launch systems. In some embodiments, the server is cloud based and operates primarily by running software for implementing or providing the following processes:

- administrator & User level Logins with two levels of password protection
- branding
- unique license code requirements
- look up tables containing list of all end customer information including site name, alarm points, device description, device GPS location, waypoints, end way point location, home waypoint location
- confirm/enable the software to pass data to the UAV Flight Control Unit
- activate siren within software, sounding computer speaker to alert operator of incoming alarm
- all incoming alarms received to be recorded in an event log allowing an audit trail, and/or
- all outgoing actions to be recorded in an event log allowing an audit trail.

In further embodiments, the control system 100 may comprise any one or more of the following features:

- Multiple options for any given event from multiple UAV to a variety of unmanned vehicles, including land, water and submerged variants (depending on the context)
- On launching the operator is provided with the telemetry data from the UAV to monitor progress and safety. This may be monitored on a separate ground control system, or may be a part of the main interface software.
- Sensors on-board the UAV (for example a camera) provide streamed situation awareness and task information back to the operator, or other entity (via a video management system and web portal/link) that may require the information.
- Additional payloads provide options to deliver different effects that are suitable to the context of the type of events being attended. These effects may be passive like electro-magnetic spectrum recordings, diagnostic or sampling equipment; or kinetic effects like bright distraction lights or loud sounds, dropped or fired projectiles or laser.
- A secure enclosure that is interfaced into the system that provides a weather tight storage and charging facility for the UAV. The arrangement of the enclosure allows it to provide a safe landing and launching zone, while supporting charging, maintenance and other logistic support functions.

Where in the foregoing description reference has been made to elements or integers having known equivalents, then such equivalents are included as if they were individually set forth. Although the invention has been described by way of example and with reference to particular embodiments, it is to be understood that modifications and/or improvements may be made without departing from the scope or spirit of the invention.

The invention claimed is:

1. A system for enabling a UAV to respond to an alert on a premises comprising:

an alert generator configured to output event type data and event location data in response to one or more alerts on the premises, a flight plan database configured to store a plurality of predetermined flight plans operable to direct a UAV to one or more locations on the premises, an event database configured to store a plurality of event types predetermined as suitable for a UAV response, and a controller configured to:
  receive the event type data and event location data,
  determine a match between the received event type and one or more event types in the event database,
  determine a direction of movement of a potential intruder from the received event location data,
  determine one or more UAV flight plans in the flight plan database, according to one or more criteria, having a destination proximate the event location, wherein the one or more criteria comprises a UAV attendance profile comprising a stealth UAV attendance profile, further wherein the stealth UAV attendance profile comprises a flight plan directing the UAV to the location of the alert to oppose a determined wind direction, and
  output the selected one or more flight plan to a UAV flight control system operable to allow a UAV to navigate to the alert location.

2. The system of claim 1, wherein the controller is further configured to:
  receive meteorological data from one or more meteorological sensors arranged to measure data indicative of meteorological conditions at or near the premises, the meteorological data comprising:
    wind direction data,
    wind speed data, and/or
    rain fall data, and
  output the selected flight plan to a UAV flight control system operable to allow a UAV to navigate to the alert location when one or more meteorological data falls within a predetermined range and/or does not exceed a predetermined threshold.

3. The system of claim 1, wherein the system further comprises a database of UAVs available for launch, and the event database and flight plan database are further configured to store information pertaining to each UAV available for launch.

4. The system of claim 3, wherein the conditions comprise one or more of available UAV flight time, charge state of a power source and/or more tolerance to one or more meteorological conditions.

5. The system of claim 1, wherein the controller is further configured to receive information pertaining to one or more conditions determining readiness of a UAV for launch, and is configured to output the selected flight plan to the UAV matching the most predetermined conditions.

6. The system of claim 1, wherein the selected flight plan further comprises a three dimensional space defined by lateral and longitudinal distance ranges for one or more altitude ranges.

7. The system of claim 6, wherein the three dimensional space defines an area within which an operator is able to control the particular position of the UAV.

8. The system of claim 1, further wherein the UAV attendance profile comprises at least one of a confrontation UAV attendance profile and a observation UAV attendance profile.

9. The system of claim 8, wherein the confrontation UAV attendance profile comprises a flight plan directing the UAV to the location of the alert to oppose the determined direction of movement of the intruder.

10. The system of claim 8, wherein the observation UAV attendance profile comprises a flight plan directing the UAV to the location of the alert to follow the determined direction of movement of the intruder.

11. The system of claim 1, wherein the flight plan output to the UAV further comprises instructions to deliver one or more on-board effects comprising emissions of sound waves or frequencies in the electro-magnetic spectrum, or the reception and onward transmission of such data, when at or proximate the alert location.

12. A controller configured for use between a security system and a UAV control system, the controller configured to:
  receive event type data and event location data from an alert generator configured to output event type data and event location data in response to one or more alerts on a premises,
  determine a match between the received event type and one or more event types in an event database configured to store a plurality of event types predetermined as suitable for a UAV response,
  determine a direction of movement of a potential intruder from the received event location data,
  determine one or more UAV flight plans from a flight plan database having a destination proximate the event location, wherein the flight plan database is configured to store a plurality of predetermined flight plans operable to direct a UAV to one or more locations on the premises wherein the one or more UAV flight plans is determined according to one or more criteria, wherein the one or more criteria comprises a stealth UAV attendance profile, further wherein the stealth UAV attendance profile comprises a flight plan directing the UAV to the location of the alert to oppose a determined wind direction, and
  output the selected one or more flight plan to a UAV flight control system operable to allow a UAV to navigate to the alert location.

13. A non-transitory computer readable medium having stored therein instructions that are executable to cause a computing device to perform functions comprising:
  receiving an event type data and event location data from an alert generator configured to output event type data and event location data in response to one or more alerts on a premises generated by an alert generator configured to output event type data and event location data in response to one or more alerts on the premises,
  determining a match between the received event type and one or more event types in an event database configured to store a plurality of event types predetermined as suitable for a UAV response,
  determining a direction of movement of a potential intruder from the received event location data
  determining one or more UAV flight plans from a flight plan database having a destination proximate the event location, wherein the flight plan database is configured to store a plurality of predetermined flight plans operable to direct a UAV to one or more locations on the premises, further wherein the one or more UAV flight plans is determined according to one or more criteria, wherein the one or more criteria comprises a stealth UAV attendance profile, further wherein the stealth UAV attendance profile comprises a flight plan directing the UAV to the location of the alert to oppose a determined wind direction, and outputting the selected flight plan to a UAV flight control system operable to allow a UAV to navigate to the alert location.

\* \* \* \* \*